H. R. & A. B. NUTTING.
CLUTCH.
APPLICATION FILED JULY 23, 1917.
1,272,081.
Patented July 9, 1918.
2 SHEETS—SHEET 2.
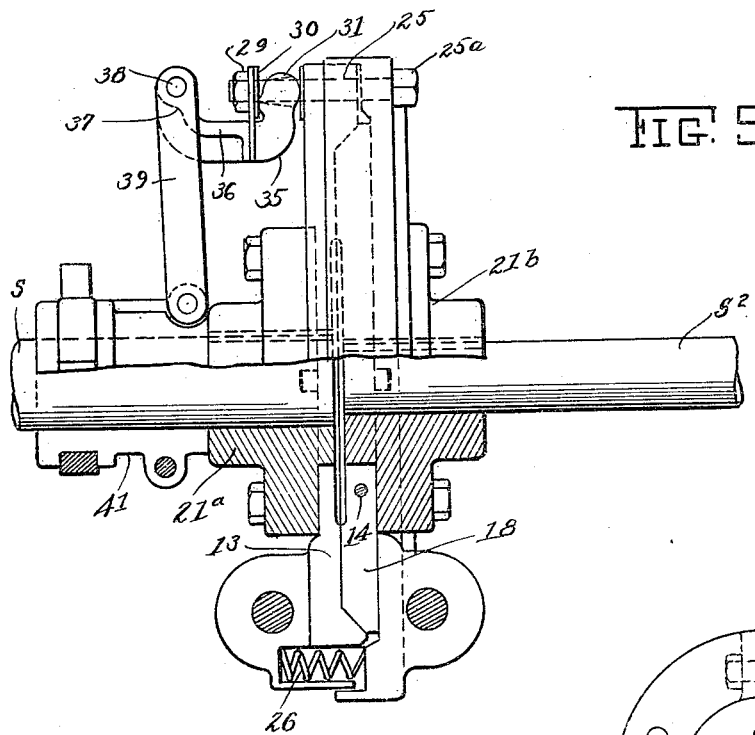
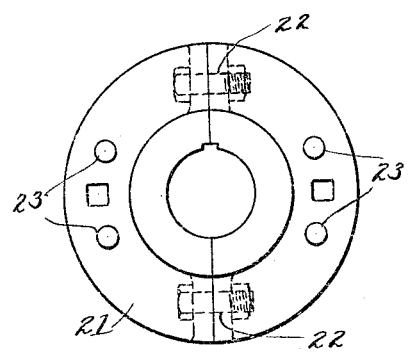
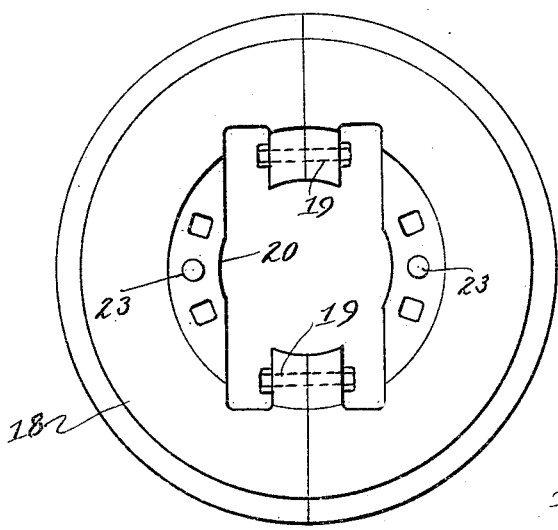
Inventors
Harvey R. Nutting
Alfred B. Nutting
By Clyde L. Rogers
their Attorney

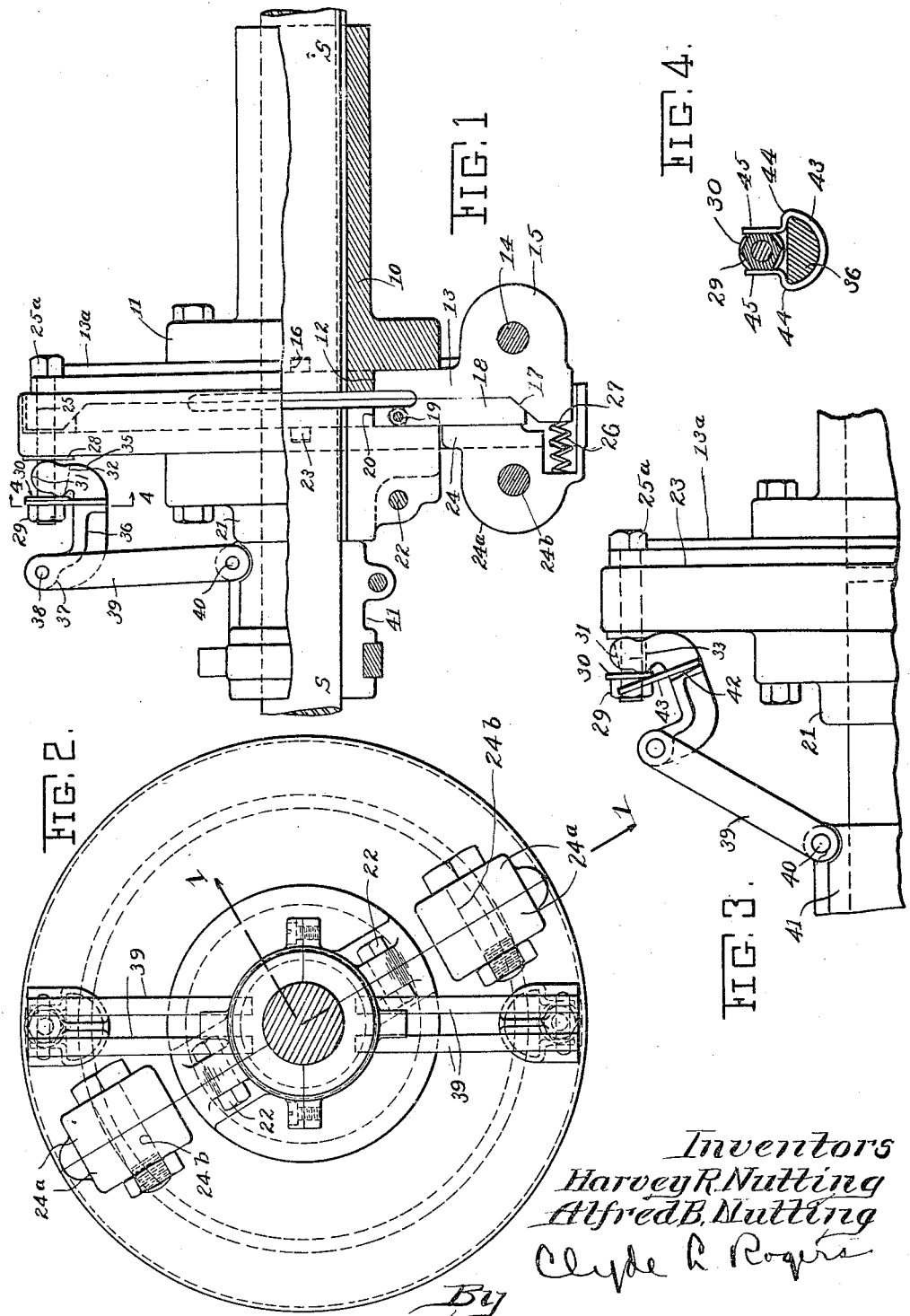

UNITED STATES PATENT OFFICE.

HARVEY R. NUTTING, OF SALISBURY, AND ALFRED B. NUTTING, OF BOSTON, MASSACHUSETTS.

CLUTCH.

1,272,081. Specification of Letters Patent. Patented July 9, 1918.

Application filed July 23, 1917. Serial No. 182,144.

*To all whom it may concern:*

Be it known that we, HARVEY R. NUTTING and ALFRED B. NUTTING, citizens of the United States, and residents, respectively, of Salisbury, in the county of Essex and Commonwealth of Massachusetts, and of Boston, in the county of Suffolk and Commonwealth of Massachusetts, have invented an Improvement in Clutches, of which the following description, in connection with the accompanying drawings, is a specification, like characters on the drawings representing like parts in each of the several views.

This invention relates to clutches in power transmission for connecting sections of shafting, shafts to pulleys, etc. The invention has to do more particularly with clutch construction wherein coöperative clutch disks or flanges are pressed together at will in clutching relation by operative mechanism employing a toggle and a cam device coöperatively associated. The principal objects of the invention are in general, to improve and simplify the construction of this type of clutches, and to produce a construction that is strong and reliable but at the same time inexpensive to produce and requiring little labor in finishing and assemblage. Another important object is to provide a clutch construction that is adaptable for connecting either sections of shafting of the same or different sizes together, or for connecting a pulley to a shaft, or for other uses merely by employing selectively the requisite hubs or sleeves for engagement with the respective shaft sections or pulley, and without requiring any change in the clutch construction otherwise. The invention also introduces certain novel principles of use which will be better understood hereinafter. The foregoing and other objects and advantages of the invention will more fully appear from the following detailed description, and the distinctive features of novelty will be pointed out in the appended claims.

Referring to the drawings:

Figure 1 is a view partly in side elevation and partly in lengthwise section on the line 1—1 of Fig. 2 showing a clutch constructed in accordance with our invention;

Fig. 2 is an end view of the clutch mechanism, with a shaft section in section;

Fig. 3 is a partial side elevation corresponding to Fig. 1 but showing the parts in a different position, *i. e.*, as they appear with the clutch open;

Fig. 4 is a sectional detail on line 4—4 of Fig. 1;

Fig. 5 is a view similar to Fig. 1 showing a modified form.

Fig. 6 is an elevation of the intermediate disk; and Fig. 7 is an elevation of the hub on which the intermediate disk is mounted.

The present clutch mechanism is here shown in Figs. 1 to 4 as employed to connect a shaft section S to an elongated sleeve 10 on which may be mounted a friction clutch pulley, this sleeve being shown as fitted on another shaft section S'; as will later appear this showing is however merely illustrative, since the clutch mechanism as a whole is adaptable for either coupling shaft sections or for clutching a friction pulley to a shaft or for other general uses by merely changing the hubs or like elements which are the immediate instrumentalities effecting engagement with the driving and driven elements. The sleeve 10 has formed adjacent its inner end a hub flange 11, the space between the outer face of this flange and the end of the sleeve forming a seat 12 on which is clamped a main clutch disk 13. This disk is, as shown, formed in two sections drawn together on to the seat 12 by suitable clamp bolts 14 passing through bosses or projections 15 of the disk sections. It is however to be understood that this main clutch disk and also the other clutch disks and hubs to be later described may be either sectional or integral at option, so far as the essentials of the present invention are concerned, the present sectional showing being merely illustrative. The clutch disk 13 has driving engagement with the hub flange 11 by means of bosses or projections 16 extending from said disk into recesses of the hub 11. The clutch disk 13 is inwardly beveled as seen at 17 adjacent its outer peripheral portion to engage a coöperative bevel on an inner clutch disk 18. This inner clutch disk 18 also illustratively shown as in two sections clamped together by a bolt 19, is mounted on a seat 20 formed on the inner face of a hub 21 fitted on the end of the shaft section S, this hub being also shown as sectional and with its sections drawn together by a clamp bolt 22. The inner clutch disk has driving engagement with this hub by means of bosses or projections 23 thereon fitting into recesses of said hub. Preferably and as shown, these projections 23 correspond in position to the projections 16 of the main clutch disk, so that the hub 21 may at will be used interchangeably with the sleeve 10 and its hub flange 11 when it is desired to use the mechanism as a shaft coupling. For pressing the inner clutch disk 18 into clutching engagement with the main clutch disk 13 a presser ring 24 is provided, this encircling the hub 21 and being drawn against the inner clutch ring 18 by draw bolts 25 having heads 25ª engaging the outer face of the main clutch disk 13, this disk having, as shown, a flange ring 13ª on its face in position to engage the heads 25ª and hold them against turning when the bolts 25 are in place. The presser ring 24 is also shown as sectional and the sections thereof formed with lugs 24ª through which passes a clamping bolt 24ᵇ. Any suitable number of the draw bolts 25 may be provided according to the size of the clutch and the duty required thereof, but as shown we employ two of these draw bolts oppositely disposed. In accordance with our invention the draw bolts 25 are formed and fitted to the respective rings in a manner so as to serve also as steady pins for guiding the clamping rings and keeping them alined, this dispensing with the necessity for separate steady pins as has heretofore been usual. For serving this further function of steady pins it is important that the draw bolts 25 be supported and held rigid from the main disk by which they are carried outward to the point where they pass through the clutch ring and as close as possible to the operating devices engaged therewith. The importance of this feature in types of clutches where there is no pulley associated therewith or any other outer flange element to hold the clutch disk and clutch ring alined, will be recognized when it is considered that owing to the impossibility of obtaining precisely equal tension on each of the draw bolts and operating devices, some particular draw bolt on which the tension is first and strongest applied will tend to spring outward under the action of the cam device, and then as the clutch ring with the bolts works back to normal position after the clutch is closed, the tension will be lost. As best seen in the upper part of Fig. 1 we adapt the draw bolts 25 to serve as steady pins without requiring either any separate steady pins or outer retaining flange, by having the peripheral portion of the main clutch disk in which these draw bolts are fixed extend inward over the intermediate clutch disk and into close proximity to the face of the clutch ring, thus holding these bolts rigid substantially up to the point where they pass through the clutch ring and relatively close to the cam operating device. In recesses of the lugs 24ª are housed springs 26 pressing against projections 27 of the main clutch disk, the purpose of these being to neutralize or overcome the centrifugal action of the lever extension 36 of the cam head 31, later more fully explained which would otherwise tend to keep the clutch disks pressed together, these springs also serving to press the clutch disks apart and thus minimize idle friction. It will be understood that the centrifugal force of the operating elements including the arms 36 and 39 serves to keep the clutch elements pressed more closely together, and the springs 26 are of such strength as to counterbalance this centrifugal force when the clutch is open, it being understood that the centrifugal force is then less on account of the lowered position of the operating arms, and the cam heads being also more off center and hence giving less leverage. The draw bolts 25 extend some little distance beyond the face of the presser ring 24 and wear washers 28 are fitted on said bolts to rest against the face of ring 24. The draw bolts have threaded on the outer ends thereof adjustable nuts 29 equipped at their inner sides with wear washers 30, the washers 28 and 30, thus adjustably spaced apart, constituting coöperative backing members against which the cam operating device now to be described, reacts at opposite sides. This cam operating device consists in a cam head 31 having a passage therethrough for the draw bolt 25, widened out at its inner portion to permit rocking of the cam head on said bolt as seen at 32. This cam head is formed with humps 33, 34 at its inner and outer sides respectively, the hump 33 being disposed radially inward with respect to the hump 34 to some little extent when the cam head is tilted to clutch opening position, but the relative movement of said humps bringing them more nearly into parallelism with the shaft and more nearly toward alinement with the center of the draw bolt 25 as the cam head is tilted to draw the clutch members to clutch closing position as seen in Fig. 1. By virtue of the inwardly widened passage 32, the outer portion of which through the back hump 33 substantially fits the bolt 25, it will be noted that the cam head thus is made to tilt with the back hump thereof substantially stationary and serving as a fulcrum, which back hump it will be observed is relatively near alinement with the bolt 25, wherefrom it results that a relatively direct pull on the bolts 25 and substantially central thereof is obtained, thus getting a more effective clamping action. The tilting or pivoting of the cam head 31 on the draw bolt 25 to effect these operative movements is obtained by an extension of said cam head, first radially inward as seen at 35, then outward lengthwise of the shaft as seen at 36, and then outward radially as seen at 37 where its extremity has pivoted thereto at 38 the outer end of an operating link 39 the inner end of which is pivoted at 40 to a sliding clutch operating collar 41 fitted on the shaft section S and operated by a suitable shipper (not shown). As will be seen from Fig. 1 the shifting of the operating collar 41 inward against the hub 21 as an abutment shifts the links 39 so that their inner ends are slightly within the perpendicular to the shaft, in which position the clutch head is held in clutch closing position, the hub 21 thus serving as a limiting stop. By the construction of the cam head 31 with its outer hump 34 and the radially inward extension 35, we provide means whereby the shifter sleeve or collar 41 is held secure and in a single definite position when the clutch is open, i. e., against "kicking" or vibration, this resulting from the fact that the cam hump 34 and the inner extremity of the portion 35 constitute substantially spaced apart points of the cam head for pressing against the face of the ring, i. e., approximately in the position shown in Fig. 3 which thus with the pressure of the springs 26 acting thereon stabilizes the shifter and holds it normally motionless. It will be understood that the nuts 29 will be adjusted up as required to produce the requisite clutch pressure between the clutch faces and to take up for wear. It is desirable that this adjustment be made only when the clutch members are drawn together in clutch closing position, since in this way a uniform adjustment of the adjusting nuts for the several draw bolts may be readily insured which would not be the case if this adjustment were made when the clutch was open. In accordance with the present invention we provide means whereby adjustment of these nuts when the clutch is open is prevented, and preferably make provision for the same element accomplishing this function to serve as a nut locking and retaining means in use. For this purpose the lengthwise extension 36 of the cam head is formed with a transverse groove 42 extending around the outer portion thereof and serving to hold in place a spring clip 43 which may be of wire and bent in to form retaining shoulders 44 engaging the inner portion of this extension 36 to hold it from displacement. The extremities 45 of this clip extend out in approximate parallelism and are spaced apart so as to engage frictionally and with some little spring pressure the opposite sides of the nut 29. The position of this spring clip is such that when the cam head 31 is tilted up into clutch closing position, the extremities 45 are pressed in toward the inner side of the nut 29 and against the washer 30, thus exposing the outer main portion of said nut for engagement by a wrench or other adjusting tool. When however the cam head 31 is tilted to clutch opening position, the extremities 45 of the spring clip moving therewith will be likewise tilted so as to extend diagonally across the nut 29 as seen in Fig. 3, thus making the entire surface thereof inaccessible for engagement by an adjusting tool. It will be understood that in the adjustment of the nut 29 with the parts shown in Fig. 1, the spring extremities 45 will yield sufficiently so as to permit the corners of the nut to pass for the necessary turning adjustment.

As already explained, the inner face of the hub 21 is equipped with a seat for receiving and holding the inner clutch disk 18 similar to seat 12 of the flange disk 11, and it is also made to correspond in size to said flange disk and with the recesses to receive the projections 23 corresponding in position to the recesses receiving the projections 16. Thus the two ends of the clutch are made interchangeable and instead of employing the long sleeve 10 adapted to receive a pulley, with the flange disk 11 carried thereby, we may employ when it is desired to connect two shaft sections together, a hub similar to the hub 21 at both ends. In Fig. 5 such a form is illustrated wherein a short hub $21^a$ is secured to the main clutch disk 13 in place of the elongated sleeve 10 of the first described form. In this form a hub $21^b$ is secured to the inner clutch disk 18, this hub being in all respects similar to the hubs 21, $21^a$ except that since as shown it is employed for making connection to a shaft $S^2$ of reduced size, its bore is correspondingly smaller so that it may be driven thereon. In this form also the hubs $21^a$, $21^b$ are shown as integral, so that they may be driven on to the ends of their respective shafts, instead of sectional, though so far as the invention is concerned this difference is immaterial. Thus it will be understood that by merely having on hand a number of the hubs 21 all formed to fit the same clutch disks 13 18, i. e., for either end of the clutch, by merely providing said hubs with bores of a varying range of sizes, the clutches may be fitted to different sized shafts, with the driving and the driven shaft either of the same or different sizes, with no other change or adjustment than merely fitting the proper hubs selected according to requirements, to the respective clutch disks. Of course the same is true with reference to the elongated sleeve members 10, these being likewise interchangeable so that different sized sleeves 10 may be provided to fit different sizes of pulleys when the device is to be employed as a pulley clutch. We are aware that the invention may be embodied in other specific forms besides the one shown, without departing from the spirit or essential attributes thereof, and we therefore desire the present embodiment to be considered in all respects as illustrative and not restrictive, reference being had to the appended claims rather than to the foregoing description to indicate the scope of the invention.

Having described our invention, what we claim as new and desire to secure by Letters Patent is:

1. Clutch mechanism, comprising coöperative disks, means for pressing them into operative engagement consisting in draw bolts, and a one-piece cam head coöperative with each of said bolts to react thereagainst having front and back humps substantially out of parallelism with said bolt in clutch opening position, said cam heads having a tilting mounting on the respective bolts with a conical hole through which the bolt is passed and formed to cause the same to fulcrum on said back hump and swing said front hump inward to a clutch closing position.

2. Clutch mechanism, comprising coöperative clutch disks, and means for drawing them into operative engagement consisting in a one-piece cam head having front and back humps disposed at substantially different points radial of the clutch in clutch opening position, and means for mounting said cam head for tilting bodily on said back hump as a fulcrum to bring said humps to nearer like radial positions, in clutch closing position.

3. Clutch mechanism, comprising coöperative clutch disks, and means for drawing them into operative engagement consisting in a one-piece tiltingly mounted cam head having front and back humps disposed at substantially different points radial of the clutch in clutch opening position and movable relatively to nearer like radial positions in clutch closing position, said cam head having an extension first radially inward of the clutch and then outward endwise thereof, with means connected to the extremity of said extension for operating the same.

4. Clutch mechanism, comprising coöperative clutch disks, and means for drawing them into operative engagement consisting in a one-piece tiltingly mounted cam head having front and back humps disposed at substantially different points radial of the clutch in clutch opening position and movable relatively to nearer like radial positions in clutch closing position, said cam head having an extension first radially inward of the clutch, then outward endwise thereof, and then radially outward with an operating link pivoted to the extremity thereof and connected to serve in conjunction therewith as a toggle.

5. Clutch mechanism, comprising coöperative clutch disks, a draw bolt for pressing said disks into operative engagement having an adjustable nut at an end thereof, and a one-piece cam head operatively engaging the inner face of said nut and tiltingly mounted on said bolt with the bolt fitted through a conical passage thereof, said cam head having an extension first radially inward of the clutch, then outward endwise thereof and then radially outward to extend around said nut and afford clearance therefor.

6. Clutch mechanism, comprising coöperative clutch disks, a draw bolt for pressing said disks into operative engagement having an adjustable nut at an end thereof, and a cam head operatively engaging the inner face of said nut and tiltingly mounted on said bolt, said cam head having an extension first radially inward of the clutch, and then outward endwise thereof, said extension bearing a spring clip yieldingly engaging the periphery of said nut to hold the same in adjustment.

7. Clutch mechanism, comprising coöperative clutch disks, a draw bolt for pressing said disks into operative engagement having an adjustable nut at an end thereof, and a cam head operatively engaging the inner face of said nut and tiltingly mounted on said bolt, said cam head having an extension first radially inward of the clutch, and then outward endwise thereof, said extension bearing a spring clip yieldingly engaging the periphery of said nut to hold the same in adjustment, said spring clip being mounted to tilt with said cam head extension so that its extremities extend diagonally across the periphery of said nut in clutch opening position to render the same inaccessible to an adjusting tool.

8. Clutch mechanism, comprising coöperative clutch disks, means for drawing the same into operative engagement having an adjustable element, and means automatically rendering said adjustable element inaccessible with said clutch disks in clutch opening position.

9. Clutch mechanism, comprising coöperative clutch disks, means for drawing the same together including a draw bolt, an adjusting nut on the end thereof, an operating device for engaging said nut, and means carried by said operating device for rendering said nut inaccessible to an operating tool in clutch open position, said means automatically movable to uncover said nut and render it accessible in clutch closed position.

10. Clutch mechanism, comprising a main clutch disk having a presser ring associated therewith, an inner clutch disk for coöperation with said main clutch disk, means for drawing said disks into operative engagement, and means for connecting said disks to a driving member and a driven member respectively, the outer faces of said disks having means associated therewith interchangeable one with the other whereby either clutch member may be engaged with the driving or the driven member.

11. Clutch mechanism, comprising a main clutch disk, an inner clutch disk, means for pressing said disks into operative engagement, and means for engaging said disks with a driving and a driven element respectively, said means for one of said disks constructed and arranged so as to be removable and interchangeable for connecting such disk either to a shaft end or to a pulley driving sleeve, at will.

12. Clutch mechanism, comprising coöperative clutch disks equipped with means for pressing them into operative engagement, each of said disks having means for engaging the same with a driving or a driven element consisting in a hub removably and interchangeably fitted thereto whereby hubs with diverse sized shaft receiving bores may be employed.

13. Clutch mechanism, comprising coöperative clutch disks equipped with means for pressing them into operative engagement and having on the outer faces of each thereof means for securing thereto removably either a short hub for securing the same to a shaft, or a hub with a relatively long sleeve for securing the same to a pulley, at will.

14. Clutch mechanism, comprising a main clutch disk rigidly secured to a shaft element, a clutch ring coöperative therewith, an intermediate clutch disk, and means for pressing them into operative engagement consisting in draw bolts rigidly and permanently held by the main clutch disk having operating devices associated therewith, said draw bolts having a sliding loose fit through said clutch ring and the portion of said main clutch disk holding said draw bolts extending inward into relatively close proximity to said clutch ring whereby said bolts are rigidly supported and adapted to serve as steady pins to hold said clutch ring guided and alined with respect to said main clutch disk without the use of separate steady pins or other alining means, said draw bolts equipped with means adjustable thereon with respect to their operating devices at the ends thereof which project through said clutch ring.

15. Clutch mechanism, comprising coöperative disks, means for pressing them into operative engagement consisting in draw bolts, operating means for said draw bolts including extended lever arms, and spring means for counterbalancing the centrifugal force due to said operating means mounted to react between said disks.

16. Clutch mechanism, comprising coöperative clutch disks, means for drawing the same together including a draw bolt and an adjusting nut on the end thereof, an operating device for engaging said nut, and a forked spring yieldingly engaging the sides of said nut to hold the same against casual displacement while permitting turning adjustment thereof.

In testimony whereof, we have signed our names to this specification.

HARVEY R. NUTTING.
ALFRED B. NUTTING.

Copies of this patent may be obtained for five cents each, by addressing the "Commissioner of Patents, Washington, D. C."